United States Patent
Spitzer et al.

(10) Patent No.: US 10,475,370 B2
(45) Date of Patent: Nov. 12, 2019

(54) FOVEALLY-RENDERED DISPLAY

(71) Applicant: GOOGLE LLC, Mountain View, CA (US)

(72) Inventors: Mark Spitzer, Mountain View, CA (US); Carlin Vieri, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/135,944

(22) Filed: Apr. 22, 2016

(65) Prior Publication Data

US 2017/0236466 A1     Aug. 17, 2017

Related U.S. Application Data

(60) Provisional application No. 62/296,278, filed on Feb. 17, 2016.

(51) Int. Cl.
*G09G 5/36* (2006.01)
*G09G 3/20* (2006.01)
(Continued)

(52) U.S. Cl.
CPC ........... *G09G 3/2085* (2013.01); *G06F 3/013* (2013.01); *G06T 19/006* (2013.01); *G09G 3/003* (2013.01);
(Continued)

(58) Field of Classification Search
CPC ........ G09G 5/395; G09G 5/363; G09G 5/001; G09G 5/06; G09G 5/14
(Continued)

(56) References Cited

U.S. PATENT DOCUMENTS 5,422,653 A * 6/1995 Maguire, Jr. ...... G02B 27/2228
345/9
5,600,347 A   2/1997 Thompson et al.
(Continued)

FOREIGN PATENT DOCUMENTS

JP    2004302065 A    10/2004
JP    2010107582 A     5/2010
(Continued)

OTHER PUBLICATIONS

Invitation to Pay Additional Fees and, Where Applicable, Protest Fee and Partial Search Report correlating to PCT/US2016/066613 dated Apr. 3, 2017, 8 pages.
(Continued)

*Primary Examiner* — Gordon G Liu
(74) *Attorney, Agent, or Firm* — Davidson Sheehan LLP

(57) ABSTRACT

A display system includes a display panel having an input to receive pixel data, the pixel data comprising a plurality of pixel values, an array of pixels partitioned into a foveal region and at least one peripheral region, and an array controller to group pixels in the at least one peripheral region into subsets of at least two pixels and to control each subset using a corresponding single pixel value from the plurality of pixel values. The display system further may include a rendering system to foveally render a display image based on the locations of the foveal region and the at least one peripheral regions, wherein for each row of the display image having pixels within at least one of the peripheral region, a number of pixel values represented in the pixel data for the row is less than a number of pixels in the row.

20 Claims, 7 Drawing Sheets

(51) Int. Cl.
  G09G 5/393     (2006.01)
  G09G 3/00      (2006.01)
  G06F 3/01      (2006.01)
  G06T 19/00     (2011.01)
  G09G 3/3266    (2016.01)
  G09G 3/3275    (2016.01)

(52) U.S. Cl.
  CPC ......... *G09G 3/3266* (2013.01); *G09G 3/3275* (2013.01); *G09G 5/393* (2013.01); *G09G 2300/0426* (2013.01); *G09G 2300/0439* (2013.01); *G09G 2310/0205* (2013.01); *G09G 2310/027* (2013.01); *G09G 2310/0218* (2013.01); *G09G 2310/0221* (2013.01); *G09G 2310/0232* (2013.01); *G09G 2310/0267* (2013.01); *G09G 2310/0291* (2013.01); *G09G 2330/021* (2013.01); *G09G 2340/0407* (2013.01); *G09G 2340/0414* (2013.01); *G09G 2340/0421* (2013.01); *G09G 2350/00* (2013.01); *G09G 2354/00* (2013.01); *G09G 2370/08* (2013.01); *G09G 2370/10* (2013.01)

(58) Field of Classification Search
  USPC ......................................................... 345/560
  See application file for complete search history.

(56) References Cited

U.S. PATENT DOCUMENTS

| | | | | |
|---|---|---|---|---|
| 6,303,921 | B1* | 10/2001 | Hastings | H04N 1/047 250/208.1 |
| 6,496,187 | B1 | 12/2002 | Deering et al. | |
| 6,781,606 | B2 | 8/2004 | Jouppi | |
| 7,488,072 | B2 | 2/2009 | Perlin et al. | |
| 2001/0033287 | A1* | 10/2001 | Naegle | G06T 15/503 345/601 |
| 2002/0109819 | A1* | 8/2002 | Tuval | A61B 3/032 351/206 |
| 2002/0113782 | A1 | 8/2002 | Verberne et al. | |
| 2004/0008173 | A1* | 1/2004 | Maeda | G09G 3/3688 345/99 |
| 2004/0095492 | A1 | 5/2004 | Baxter et al. | |
| 2004/0227703 | A1 | 11/2004 | Lamvik et al. | |
| 2005/0185281 | A1 | 8/2005 | Perlin et al. | |
| 2008/0030748 | A1 | 2/2008 | Wang et al. | |
| 2009/0160872 | A1 | 6/2009 | Gibbons | |
| 2012/0319928 | A1 | 12/2012 | Rhodes | |
| 2014/0267616 | A1 | 9/2014 | Krig | |
| 2016/0125257 | A1* | 5/2016 | Sankaranarayanan | G06K 9/4638 382/199 |
| 2018/0136315 | A1 | 5/2018 | Gogolla et al. | |

FOREIGN PATENT DOCUMENTS

| | | |
|---|---|---|
| JP | 2013152386 A | 8/2013 |
| WO | 2015153167 A1 | 10/2015 |

OTHER PUBLICATIONS

Guy Godin, et al., "Dual-Resolution Stereoscopic Display with Scene-Adaptive Fovea Boundaries", 8th International Immersive Projection Technology Workshop, May 13-14, 2004, Ames, IA, USA, National Research Council of Canada, pp. 1-8.

Benjamin A. Ahlborn, et al., "A Foveal Inset for Large Display Environments", University of California, Davis Department of Computer Science Institute for Data Analysis and Visualization, Mar. 25, 2006, pp. 1-2.

Written Opinion of the International Preliminary Authority for PCT Application No. PCT/US2016/066613, 9 pages.

International Preliminary Report on Patentability dated May 24, 2018 for PCT Application No. PCT/US2016/066613, 20 pages.

English Translation of Korean Office Action dated Apr. 19, 2019 for corresponding Korean Application No. 10-2018-7015527, 10 pages.

English Translation of Japanese Office Action dated Jun. 25, 2019 for corresponding Japanese Application No. 2018-546602, 4 pages.

International Search Report and Written Opinion correlating to PCT/US2016/066613, dated Jul. 19, 2017, 19 pages.

* cited by examiner

FOVEALLY-RENDERED DISPLAY

CROSS-REFERENCE TO RELATED APPLICATIONS

The present application claims priority to U.S. Patent Application Ser. No. 62/296,278, entitled "Foveally-Rendered Display" and filed on Feb. 17, 2016, the entirety of which is incorporated by reference herein.

FIELD OF THE DISCLOSURE

The present disclosure relates generally to display systems and more particularly to foveal rendering and display.

BACKGROUND

The human eye is most sensitive to detail in the region of a displayed image that is projected onto the fovea, as the fovea contains the highest density of cones within the retina. The retina's ability to perceive detail thus decreases with distance from the fovea. Virtual reality (VR) systems, augmented reality (AR) systems, and other display systems leverage this characteristic of the retina in a process referred to as foveal rendering, in which the region of an image that is the focus of the eye (that is, falls upon the fovea) is rendered with a higher resolution, while the remainder of the image is rendered at a lower resolution. Foveal rendering thus typically has a lower computational load than conventional full-resolution rendering processes. However, conventional displays used for VR or AR typically have a constant or uniform display pixel density across the entire display panel, due at least in part to the requirement that the display be capable of providing an image to the fovea of a user's eye from any area of the display that the user may gaze upon. As a result, it is still necessary to deliver high-resolution pixel data to drive such conventional display panels. Accordingly, while computational load may be reduced in rendering the display image, the implementation of foveal rendering in conjunction with a conventional display does not reduce the bandwidth requirements for transmitting display data to the display, nor does it reduce the power consumed by the display backplane in order to clock in the pixel data for the foveally-rendered display image.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

Figure 1:
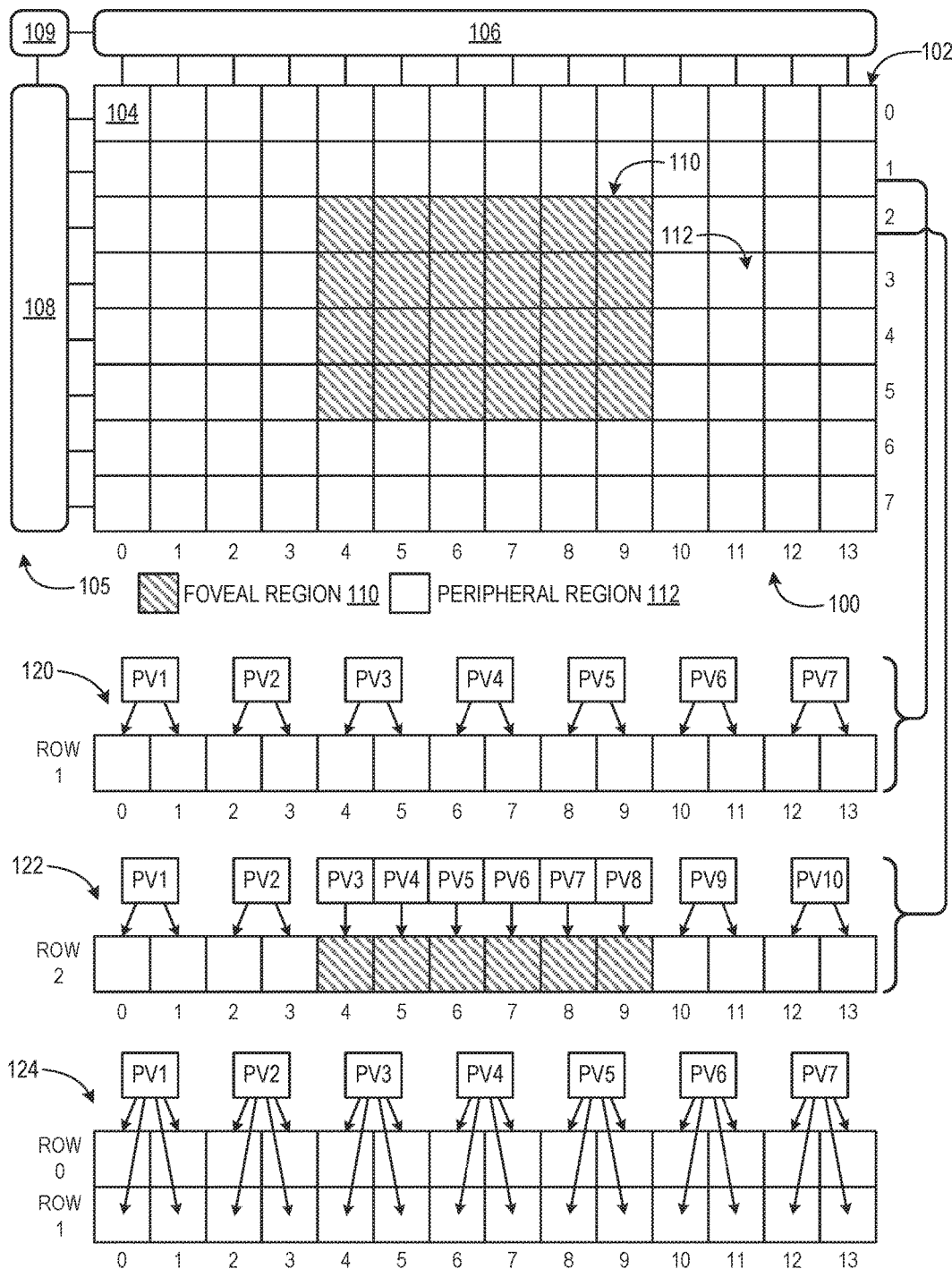
FIG. 1 is a diagram illustrating an example foveally-configurable display panel in accordance with some embodiments.

The following description is intended to convey a thorough understanding of the present disclosure by providing a number of specific embodiments and details involving display systems utilizing foveally-configurable displays. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-8 illustrate example systems and techniques for utilizing a foveally-configurable display panel in conjunction with foveal rendering so as to reduce the amount of pixel data to be transmitted to the display panel, and thus reduce display power consumption, bandwidth requirements, and associated complexity. In at least some embodiments, the pixel array, or image space, of a display image to be rendered is logically segmented into two or more regions, including at least a foveal region representing the region of the display image which is expected or estimated to be the target of the user's gaze, and at least one peripheral region surrounding this foveal region. A foveal rendering process is employed by a rendering system to foveally render the display image based on the identified regions, with the foveal region being rendered at the highest resolution, and the one or more peripheral regions being rendered at lower resolutions, where, in some embodiments, the resolution of a peripheral region may be based at least in part on the distance of that region from the foveal region.

The foveally-rendered display image is then scanned out from the rendering system for display at a foveally-configurable display. In at least one embodiment, the foveally-configurable display includes an array of pixels arranged as rows and columns, and further includes an array controller that is configurable to pair or group together pixels that have locations that correspond to a peripheral region such that a single pixel value in the received pixel data is used to drive all of the pixels within a corresponding pairing/grouping. That is, each grouping of pixels within a peripheral region shares the same pixel value from the transmitted pixel data. Meanwhile, pixels having locations that correspond to the foveal region continue to be controlled and driven using separate pixel values. That is, each pixel within the foveal region is driven with separate, unique pixel data. Under this approach, less pixel data is transferred between the rendering system and the foveally-configurable display for the peripheral regions. This has the effect of reducing the bandwidth requirements to transmit the pixel data for a foveally-rendered display image to the display, as well as reducing the power consumption by the display panel in clocking in the associated pixel data.

FIG. 1 illustrates an example foveally-configurable display panel 100 for displaying foveally-rendered display images in accordance with at least one embodiment of the present disclosure. The display panel 100 includes an array 102 of pixels 104 arranged in rows and columns. In the depicted example, the array 102 is illustrated with a relatively low resolution, with fourteen columns (columns 0-13) and eight rows (rows 0-7), and thus has 112 pixels 104. However, it will be appreciated in actual implementation the display panel 100 would typically have a much higher resolution, typically on the order of thousands or even tens-of-thousands of rows and columns. Each pixel 104 may be implemented as a matrix of sub-pixels, such as a particular arrangement of red, green, and blue (RGB) sub-pixels, each of which is controlled to emit light of the corresponding color at a corresponding luminance, and the combination of light colors and their luminance results in the intended brightness and color for the pixel as a whole. Examples pixel architectures for the pixels 104 can include, for example, light emitting diodes (LEDs) and organic light emitting diodes (OLEDs).

The display panel 100 further includes an array controller 105 that includes a column-control component 106, a row-control component 108, and a foveal control component 109. As described in greater detail below, the column-control component 106 may include pixel data buffers, line drivers, and column combination logic that together operate to control the pixels 104 on a column-by-column basis. Similarly, as also described below, the row-control component 108 may include row select logic and row combination logic that together operate to control the pixels 104 on a row-by-row basis.

Figure 2:
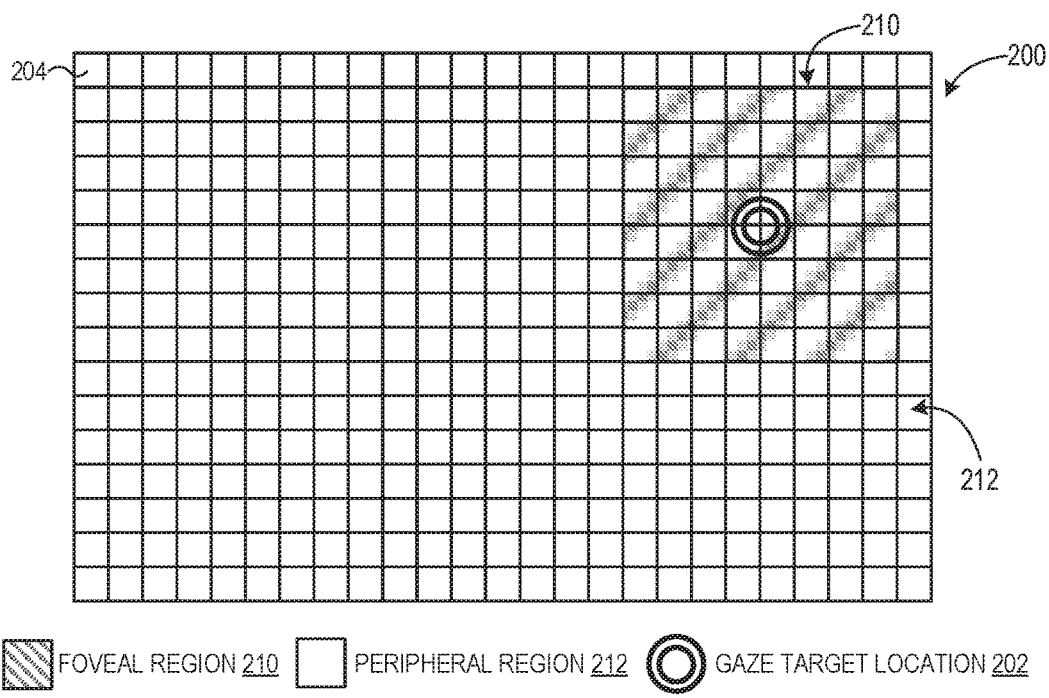
FIG. 2 is a diagram illustrating an example foveally-configurable display panel with a foveal region positioned based on current gaze direction in accordance with some embodiments.

As described below, a rendering system employing the display panel 100 identifies a foveal region 110 in the array 102 that corresponding to a user's expected gaze direction. In some embodiments, this foveal region 110 is a fixed region of the array 102. For example, it may be expected that the user may primarily gaze at the center of the display panel 100, and thus the foveal region 110 may be set to a region of pixels 104 centered around this center point of the display panel 100. In other embodiments, the rendering system may employ a gaze tracking system that tracks the gaze direction of one or both of the user's eyes, and from this identifies the location in the array 102 that is the target of the user's gaze (this location being referred to herein as the "gaze target location"). To illustrate, FIG. 2 depicts an example display panel 200 (one embodiment of the display panel 100) in which a gaze tracking system of a display system employing the display panel 200 identifies the user's gaze direction and from this estimates a location 202 in the display panel 200 as the current gaze target location. On this basis, the display system may designate, for example, an 8×8 array of pixels 204 centered around this location 202 as a foveal region 210 and designate the remaining pixels 204 as a peripheral region 212 for the next display image to be rendered.

Returning to FIG. 1, with the gaze target location so estimated or otherwise identified, the foveal region 110 may be determined as the region surrounding this gaze target location. The remainder of the array 102 may be logically partitioned into one or more peripheral regions, such as the single peripheral region 112 surrounding the foveal region 110 as depicted in FIG. 1. The dimensions of the foveal region 110 (as measured in pixels 104) may be based on a number of factors, including the overall resolution of the display panel 100, the number of different peripheral regions to be implemented, the distance between the display panel 100 and the user's eye, the presence of any lenses or other optical systems between the display panel 100 and the user's eye and their effect on the user's perception of the display panel 100, and the like. To illustrate, assuming that foveal vision occurs in an area+/−five degrees horizontal and +/−five degrees vertical of the optical axis of the eye, the foveal region 110 may be dimensioned to cover this foveal field of view, and further may include some additional margin. The amount of margin to be included may be based on the potential error in estimating the gaze direction of the eye. To illustrate, for the example of FIG. 1, it may be assumed that a region of 4×4 pixels represents the foveal field of view, and there is a margin of error in gaze tracking in the horizontal direction that is compensated for by adding one column of pixels on each side of the 4×4 region (assume negligible vertical eye tracking error in this example), and thus resulting in the example foveal region 110 dimensioned at 6 pixels×4 pixels. Further, in the example of FIG. 1, the foveal region 110 is identified as centered within the array 102, either as this is a fixed location for the foveal region or an eye tracking system has estimated the user's gaze to be currently directed to the center of the display panel 100.

Figure 3:
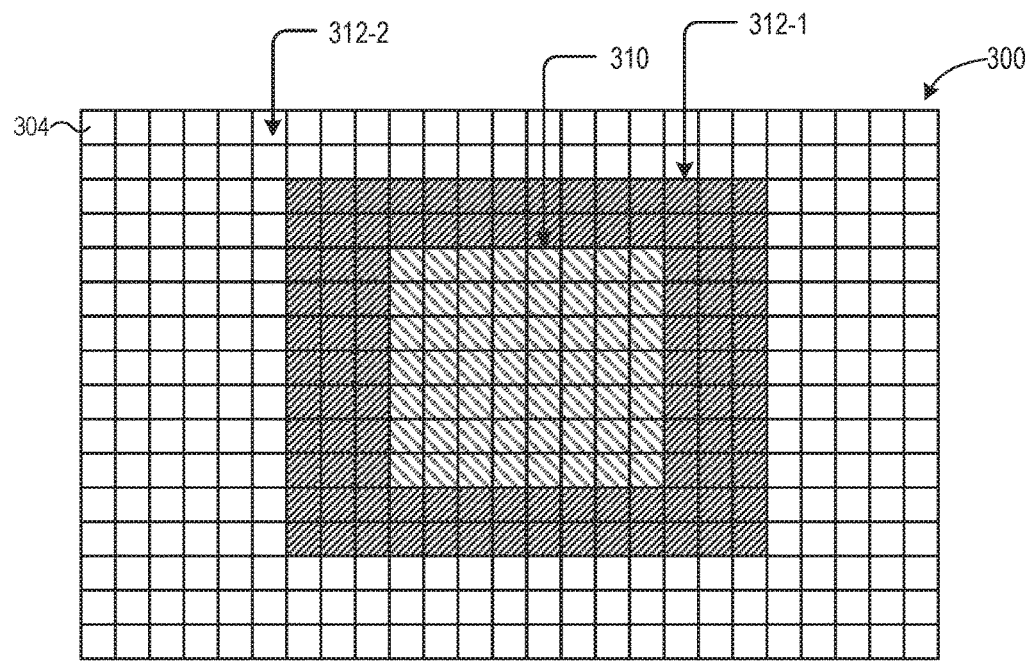
FIG. 3 is a diagram illustrating an example foveally-configurable display panel with multiple peripheral regions in accordance with some embodiments.

Although the example of FIG. 1 depicts a single peripheral region 112, in some embodiments the remaining region of the display panel 100 may be divided into multiple peripheral regions. To illustrate, FIG. 3 depicts an example display panel 300 in which a foveal region 310 is defined, and the remaining pixels of the display panel 300 are divided into two concentric peripheral regions: a proximate peripheral region 312-1 surrounding the foveal region 310 and a distal peripheral region 312-2 surrounding the proximate peripheral region 312-1. In instances whereby there are multiple peripheral regions, a display image may be foveally rendered and the display panel 300 may be correspondingly configured such that the resulting resolution implemented within each peripheral region decreases with the distance from the foveal region. To illustrate, pixels 304 in the proximate peripheral region 312-1 may be grouped into subsets of N pixels 304 (N>=2), such that every N pixels 304 in the proximate peripheral region 312-1 are controlled based on a single pixel value, whereas pixels 304 in the distal peripheral region 312-2 are grouped into subsets of M pixels 304 (M>N) such that every M pixels 304 in the distal peripheral region 312-2 are controlled based on a single pixel value.

Referring back to FIG. 1, with the location and dimensions of the foveal region 110 identified (as well as the location and dimensions of the one or more peripheral regions 112 identified as a result), a processing system may render the next display image using a foveal rendering process that renders the resulting display image with higher resolution within the region corresponding to the foveal region 110 and lower resolution(s) with the region(s) corresponding to the one or more peripheral regions 112. In a conventional foveal rendering process utilized for displaying imagery on a conventional display, the resulting rendered image has a separate pixel data for each pixel of the display. The computational load savings in such conventional foveal rendering processes come from the fact that rather than having to calculate a unique pixel value for each pixel, the same pixel value may be duplicated for more than one pixel located in the non-foveal, or peripheral, region(s) of the image. Thus, while this duplication of pixel values for pixels in peripheral regions reduces the number of rendering computations, the amount of pixel data generated for a display image rendered using a conventional foveal rendering process typically is the same as the amount of pixel data generated for a display image without foveal rendering, for the same given display resolution.

The foveally-configurable display panel 100 may be configured so as to logically partition the pixels 104 of the array 102 into the foveal region 110 and one or more peripheral regions 112. For ease of reference, those pixels falling within a foveal region are referred to herein as "foveal pixels," whereas those pixels falling within a peripheral region are referred to herein as "peripheral pixels." The display panel 100 then may pair or otherwise group subsets of the pixels 104 within the peripheral regions 112 so that they are driven or otherwise controlled using the same single pixel value. Thus, with this capability, the foveal rendering process employed by the rendering system may render the display image such that pixels of the display image within the peripheral regions are combined or grouped into subsets of pixels, and each such subset of pixels is rendered as a single pixel value in the pixel data for the corresponding display image. Thus, in contrast to conventional foveal rendering approaches, the amount of pixel data to be transmitted to the display panel 100 from the rendering system may be reduced, thereby reducing the bandwidth requirements of the connection between the display panel 100 and the rendering system, as well as reducing the power consumed by the display panel 100 in clocking in this pixel data.

In one embodiment, the array controller 105 groups peripheral pixels on a row-basis via the column-control component 106 such that two or more adjacent pixels in a given row within the peripheral region 112 may be grouped into a corresponding subset. For example, view 120 illustrates a configuration implemented via the column-control component 106 in which the pixels 104 of row 1 of the array 102 are grouped into subsets of two pixels. In this example, every pixel 104 of row 1 is included in this grouping configuration because the entirety of row 1 is within the peripheral region 112. As a result, with reference to pixel locations within array 102 designated as (X,Y), with X representing the row and Y representing the column, the pixels 104 at (1,0) and (1,1) are grouped in a subset, the pixels 104 at (1,2) and (1,3) are grouped in a subset, the pixel 104 at (1,4) and (1,5) are grouped in a subset, the pixels 104 at (1,6) and (1,7) are grouped in a subset, the pixels 104 at (1,8) and (1,9) are grouped in a subset, the pixels 104 at (1,10) and (1,11) are grouped in a subset, and the pixels 104 at (1,12) and (1,13) are grouped in a subset. As a result, the fourteen pixels 104 in row 1 are grouped into seven pixel subsets. Each pixel subset is then driven using a single pixel value based on the configuration provided by the column-control component 106. To illustrate, pixel value PV1 is used to drive the pixels 104 of the first subset, pixel value PV2 is used to drive the pixels 104 of the second subset, and so forth. Thus, in this configuration, when it is time to drive the pixels 104 of row 1, only seven pixel values need to be transmitted from the rendering system to the display panel 100 in the pixel data for row 1 in order to drive the fourteen pixels of row 1. A conventional display with the same horizontal resolution would require fourteen pixel values to drive row 1, and thus the grouped pixel subset approach for peripheral regions provides a 50% reduction in data to be transmitted for row 1 in this particular example.

View 122 illustrates the configuration implemented by the column-control component 106 for a row that includes pixels within the foveal region 110. In this example, row 2 includes six pixels 104 in the foveal region 110, with these six pixels bordered on each side by four pixels 104 in the peripheral region 112. Accordingly, when it comes time to drive the pixels 104 of row 2, the column-control component 106 may group the pixels 104 of row 2 that are located in the peripheral region 112 into subsets of two or more pixels 104. In the illustrated example, these pixels are grouped into subsets of two pixels 104, such that the pixels 104 at (2,0) and (2,1) are grouped into a subset, the pixels 104 at (2,2) and (2,3) are grouped into a subset, the pixels 104 at (2,10) and (2,11) are grouped into a subset, and the pixels 104 at (2,12) and (2,13) are grouped into a subset. The pixels 104 at (2,4), (2,5), (2,6), (2,7), (2,8), and (2,9) are located in the foveal region 110 and thus are not grouped into subsets. As each of the pixel subsets is driven using a single pixel value, and as each of the pixels 104 in the foveal region 110 are driven using a separate pixel value, when it is time to drive the pixels 104 of row 2, ten pixel values will need to be transmitted to the display panel 100, with pixel values PV1, PV2, PV9, and PV10 used to drive the pixels 104 of the four pixel subsets in the peripheral region 112 and pixel values PV3, PV4, PV5, PV6, PV7, and PV8 used to drive the six pixels 104 of row 2 that are in the foveal region 110. In contrast, a conventional display with the same horizontal resolution would require fourteen pixel values to drive row 2, and thus and thus the grouped pixel subset approach for peripheral regions provides a 28.5% reduction in data to be transmitted for row 2 in this particular example.

In addition to grouping pixels 104 in the same row when they fall within a peripheral region, the grouping of peripheral region pixels 104 may also extend to grouping of peripheral region pixels across multiple adjacent columns via the row-control component 108 such that peripheral region pixels in adjacent rows may be included in a corresponding subset. To illustrate, rows 0 and 1 are entirely composed of peripheral pixels 104 (that is, none of the pixels 104 of rows 0 and 1 fall within the foveal region 110), and thus the row-control component 108 may tie rows 0 and 1 together such that the pixel 104 in a particular column of row 0 is grouped with the pixel 104 in the same column in row 1. The pixels 104 of rows 0 and 1 are thus driven using the same pixel value. Rows 6 and 7 likewise may be tied together as they are composed entirely of peripheral pixels 104. Further, when implemented with row-based grouping, a single pixel value may be used to drive multiple row-adjacent peripheral pixels 104 as well as multiple column-adjacent peripheral pixels 104. For example, view 124 illustrates an example configuration via the column-control component 106 and row-control component whereby the pixels 104 of row 0 are grouped into two-pixel subsets, the pixels of row 1 are grouped into two pixel-subsets, and column-adjacent subsets are grouped so as to form seven four-pixel subsets, with each subset comprising two row-adjacent pixels 104 in row 0 and two row-adjacent pixels in row 0 that are column-adjacent to the pixel pair in row 0. Thus, in this example configuration, a single pixel value may be used to drive four peripheral pixels 104, and thus only seven pixel values need to be transmitted to the display panel 100 to drive the 28 pixels 104 of rows 0 and 1, and thus providing a 75% reduction in the necessary data transmission compared to a conventional display implementation.

Figure 4:
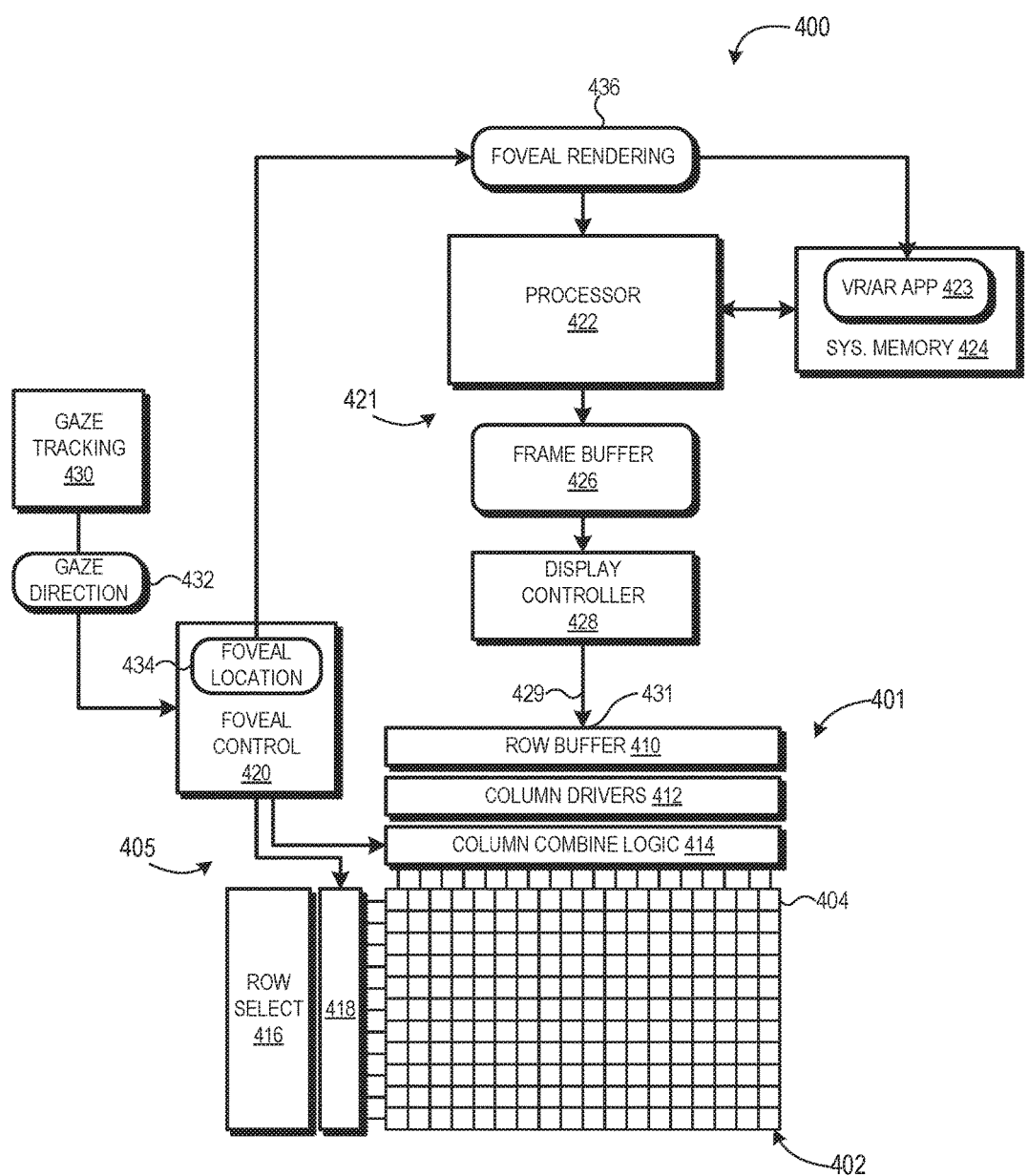
FIG. 4 is a diagram illustrating a display system implementing a foveally-configurable display panel in accordance with some embodiments.

FIG. 4 illustrates an example display system 400 utilizing foveal rendering and a foveally-configurable display panel in accordance with at least one embodiment. The display system 400 may comprise a display system implemented in a head mounted display (HMD), a heads-up display, or other near-eye display device. For ease of reference, the display system 400 is described below in the example context of an HMD supporting VR or AR capability. However, the display system 400 may be implemented in other contexts using the guidelines provided herein.

The display system 400 includes a foveally-configurable display panel 401 (one embodiment of display panel 100) having an array 402 of pixels 404 arranged in rows and columns, as well as an array controller 405 having a column-control component 406 and a row-control component 408. In the depicted example, the column-control component 406 includes a row buffer 410, a set of column drivers 412 (one for each column of the array 402), and column combine logic 414. The row-control component 408 includes row select logic 416 and row combine logic 418. The array controller 405 further includes a foveal control component 420 coupled to the column combine logic 414 and the row combine logic 418. In stereoscopic implementations, the display system 400 may logically divide the display panel 401 into two regions, one for each eye of the user, and drive separate display imagery to each region. In other embodiments, the display system 400 may implement a separate display panel 401, frame buffer 426, and display controller 428 for each eye of the user.

The display system 400 further includes a rendering system 421 comprising a processor 422, a system memory 424, a frame buffer 426 (which may be implemented in system memory 424), a display controller 428 connected to the display panel 401 via an interconnect 429, and in some embodiments, a gaze tracking system 430. The gaze tracking system 430 may comprise any of a variety of gaze tracking systems utilized to track a user's gaze relative to a corresponding display panel as known in the art. The processor 422 comprises one or more central processing units (CPUs), graphics processing units (GPUs), or a combination of one or more CPUs and one or more GPUs. The display controller 428 may be implemented as, for example, an ASIC, programmable logic, as one or more GPUs executing software that manipulates the one or more GPUs to provide the described functionality, or a combination thereof. In operation, the processor 422 executes a VR/AR application 423 (stored in, for example, the system memory 804) to provide VR/AR functionality for a user. As part of this process, the VR/AR application 423 manipulates the processor 422 or associated processor to render a sequence of images for display at the display panel 401, with the sequence of images representing a VR or AR scene. The display controller 428 operates to transmit the pixel data constituting this sequence of images via the interconnect 429 to scan-in logic (not shown in FIG. 4) which serves as the pixel data input 431 of the display panel 401, whereupon the display panel 401 operates to display the sequence of images based on this pixel data, as described in greater detail herein.

Figure 5:
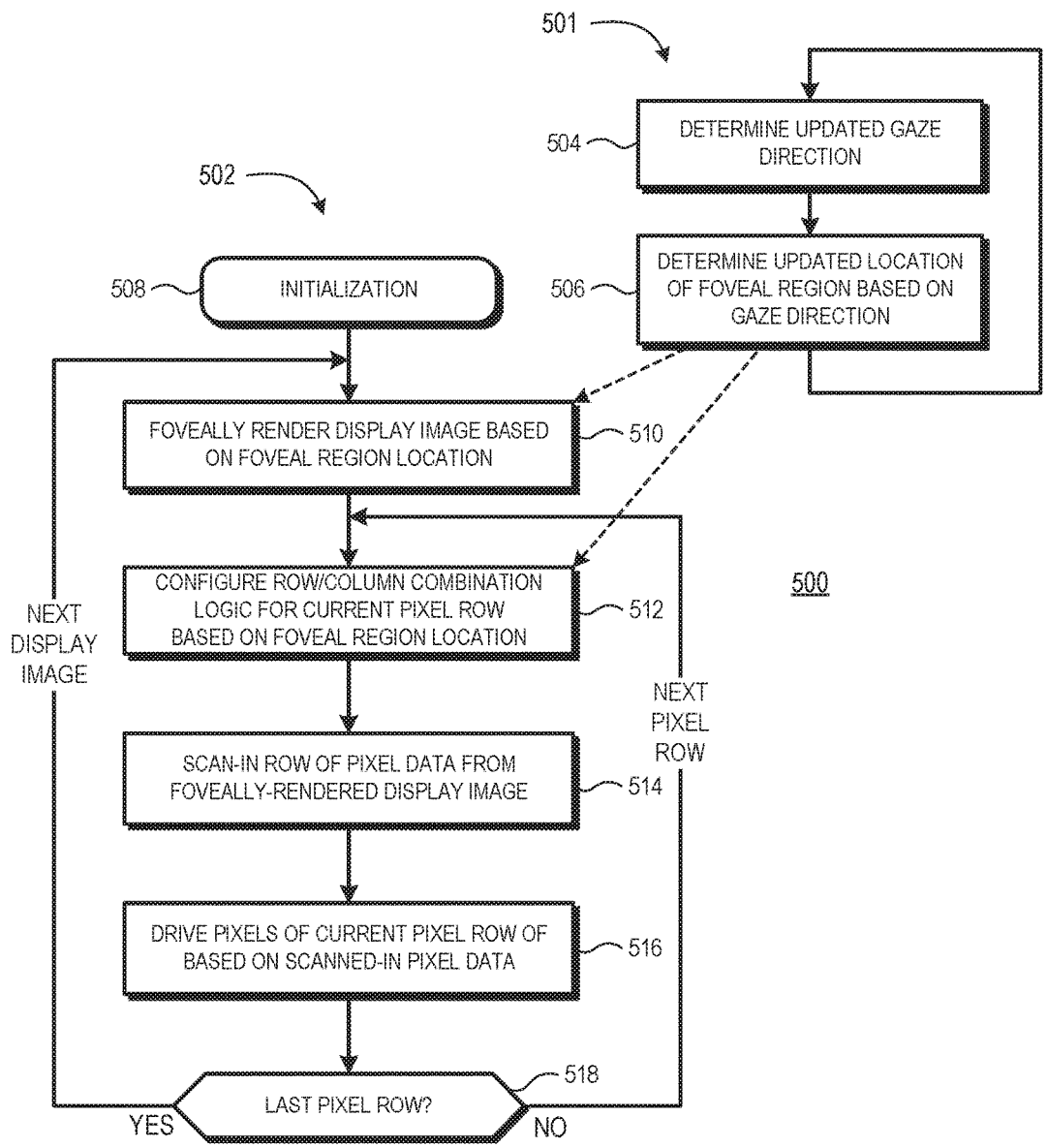
FIG. 5 is a flow diagram illustrating a method of operation of the display system of FIG. 4 in accordance with some embodiments.

FIG. 5 illustrates an example method 500 of operation of the display system 400 for foveal rendering and foveal display of a sequence of display images representative of VR or AR imagery. In implementations whereby the display system 400 implements the gaze tracking system 430, the method 500 is represented by two separate method flows, flow 501 and flow 502, performed concurrently. In implementations whereby the display system 400 implements a fixed foveal region, flow 501 may be omitted.

Flow 501 represents the operation of the gaze tracking system 430 and foveal control component 420 to track and update the current gaze direction of the user's eyes and to update the location of a foveal region (e.g., foveal region 110, FIG. 1) and one or more peripheral regions (e.g., peripheral region 112, FIG. 1) of the display panel 401 accordingly. Thus, at block 504 the gaze tracking system 430 performs a suitable gaze tracking process to determine the current gaze direction 432 (FIG. 4) and provides a representation of the current gaze direction 432 to the foveal control component 420 (e.g., by storing one or more values representative of the current gaze direction 432 to a register or other storage location accessible by the foveal control component 420). At block 506, the foveal control component 420 determines the gaze target location (e.g., gaze target location 202, FIG. 2) within the display panel 401 based on the current gaze direction 432, and from this identifies the current foveal region of the display panel 401. In some embodiments, the dimensions of the foveal region may be fixed, for example, as a region of N×M pixels, and thus the foveal control component 420 thus may set the location of the foveal region so as to be substantially centered around the gaze target location, such that the N×M pixels surrounding the gaze target location are designated as foveal pixels. In other embodiments, the dimensions and/or shape of the foveal region may change depending on a number of factors. To illustrate, the dimensions of the foveal region may decrease with distance from the center of the display panel 401, or vice versa, or the shape may change depending on the particular location of the gaze target location.

When the location of the foveal region is determined, the foveal control component 420 then may store a foveal region location identifier 434 in a register, buffer, or other storage element. To illustrate, assuming fixed dimensions for the foveal region, the foveal region location identifier 434 may be represented by a coordinate pair (X,Y) representing the row and column of, for example, the upper-left-most pixel 404 in the foveal region. If the foveal region has one or more variable dimensions, the foveal region location may be represented by, for example, the coordinate pair (X,Y) identifying the pixel 404 defining the upper-left-corner of the foveal region and then two values representing the horizontal extent and vertical extent, in terms of pixels, of the foveal region. The processes of blocks 504 and 506 thus may be repeated in this manner at a particular rate, such as at the gaze direction update frequency of the gaze tracking system 430 or at the frame rate of the display system.

Concurrent with the gaze direction update/foveal region update process of flow 501, flow 502 operates to render and display a sequence of images via the display panel 401. Accordingly, at block 508 the display system 400 implements an initiation process whereby various parameters are set, such as frame rate, foveal region dimensions, and the like. Part of this initialization process may include the loading and initiation of execution of the VR/AR software application 423. After this initialization, the display system 400 initiates the rendering and display of a sequence of display images representing VR or AR imagery.

Accordingly, at block 510 the VR/AR software application 423 initiates the rendering of a display image based on the current foveal region location. To this end, the display system 400 implements a foveal rendering process 436 (FIG. 4) that renders a display image such that the region of the display image corresponding to the current foveal region location is identified based on the stored foveal region location identifier 434 and rendered at a higher resolution, whereas the remainder of the display image is rendered at one or more lower resolutions (in which a single pixel value is used to control the operation of a corresponding grouping of two or more pixels 404 of the array 402). The foveal rendering process 436 may be implemented as hardcoded logic by the processor 422, as software code that is part of the VR/AR software application 423, or as a separate software function (e.g., an application program interface (API) called by the VR/AR software application 423). The resulting foveally-rendered display image is buffered in the frame buffer 426.

Figure 6:
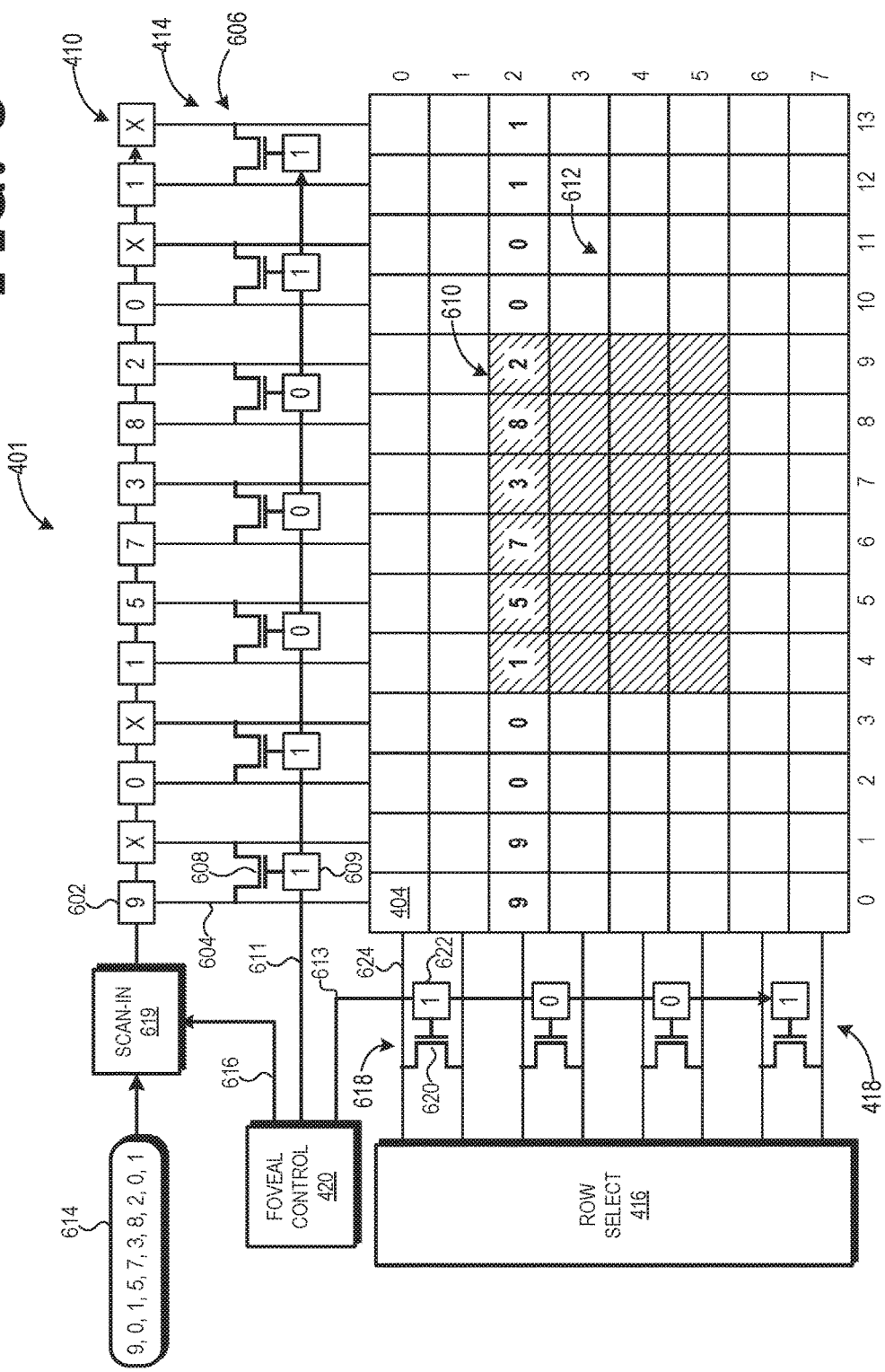
FIG. 6 is a diagram illustrating an example implementation of a foveally-configurable display panel in accordance with some embodiments.
Figure 7:
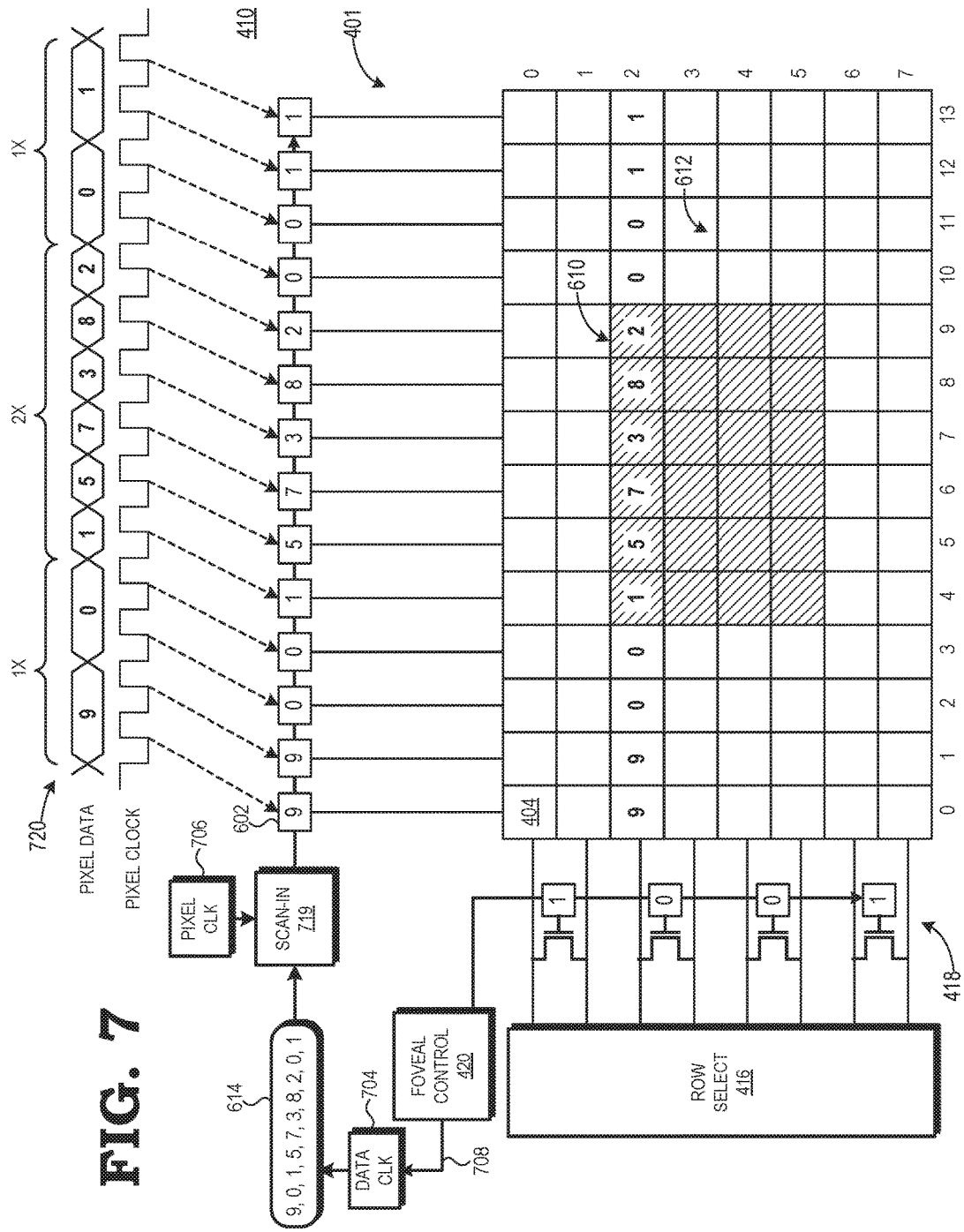
FIG. 7 is a diagram illustrating another example implementation of a foveally-configurable display panel in accordance with some embodiments.
Figure 8:
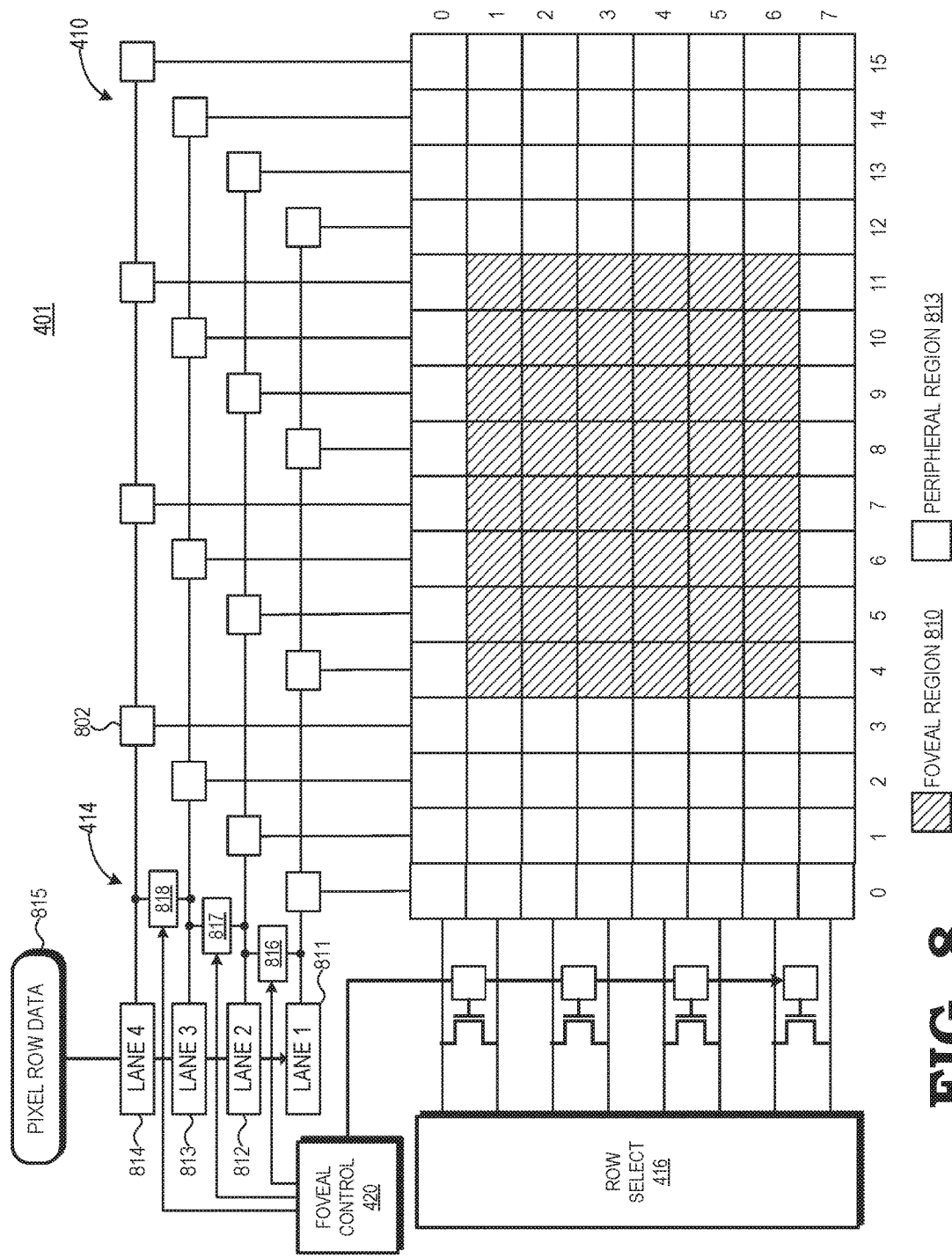
FIG. 8 is a diagram illustrating yet another example implementation of a foveally-configurable display panel in accordance with some embodiments.

As with conventional display panels, the display panel 401 operates to display an image on a row-by-row basis, which pixel data for each row of pixels is scanned in and displayed in sequence, typically starting with the top-most row of pixels. Accordingly, before driving a given row of pixels of the display panel 401, at block 510 the foveal control component 420, the column combine logic 414, and the row combine logic 418 operate together to configure the pixels 404 of the current row based on the particular region in which each pixel 404 is located. Any pixels 404 in the current row that fall within the current foveal region are maintained as separate pixels 404. The other pixels 404 are then grouped into subsets of two or more pixels, as described above. FIGS. 6-8 illustrate example configurations of the column combine logic 414 and row combine logic 418 for implementing this grouping of peripheral pixels.

Before, during, or after the configuration process of block 512, at block 514 the display controller 428 accesses the current row of pixel data of the frame image from the frame buffer 426 and transmits the pixel data to the display panel 401, whereupon the pixel data is scanned into the row buffer 410. After scan-in of the pixel data for the current pixel row is completed, at block 516 the row select logic 416 asserts the control lines associated with the current pixel row of the display panel 401 and the set of 412 of column drivers drive a voltage on the corresponding column lines, with the drive voltage of each column driver based on the corresponding pixel value associated with the same column. As described in greater detail below with reference to FIGS. 6-8, during this pixel drive process, the configurations of the column combine logic 414 and row combine logic 416 operate so that a single pixel value in the row of pixel data transmitted by the display controller 428 is used to drive multiple peripheral pixels in the current row, and thus permitting fewer pixel values to be both rendered and transmitted for those rows of the display image that at least partially overlap with a peripheral region. Moreover, in the event that the current row and an adjacent row are comprised entirely of peripheral pixels, the same pixel value may be used to drive peripheral pixels in two or more rows, which further reduces the pixel data transmission requirements.

After the drive process for the current pixel row completes, the display system 400 determines at block 518 whether the current pixel row is the last pixel row of the display image. If not, the row select logic 416 increments to the next row and the process of blocks 512, 514, 516, and 518 repeats for the next row of the display frame and corresponding row of the display panel 401. Otherwise, if the current pixel row is the last row of the display image, the method 500 returns to block 510 for the foveal rendering and display of the next display image.

FIGS. 6-8 illustrate example implementations of the column combine logic 414, row combine logic 418, and foveal control component 420 for row-by-row configuration of the display panel 401 so as to configure a foveal region and one or more peripheral regions of pixels 404 of the array 402. In the implementation of the display panel 401 depicted in FIG. 6, the row buffer 410 is implemented as a set of column buffers 602, with each column buffer 602 being associated with a corresponding column of pixels 404 and configured to store a pixel value that controls a column driver (not shown in FIG. 6) to apply a corresponding voltage to the column control line 604 associated with the corresponding column. Further, the column combination logic 414 is implemented as a switch array 606 comprising a plurality of transistors or other switch components 608 and control bit buffers 609. Each switch component 608 connected to two adjacent column control lines 604. When a bit value "1" is stored to the corresponding control bit buffer 609, the switch component 608 is engaged and operates to electrically connect the two adjacent control lines 604 to which it is connected. Conversely, when a bit value "0" is stored to the corresponding control bit buffer 609, the switch component 608 is disengaged and thus electrically isolates the two adjacent column control lines 604. Thus, in this manner the foveal control component 420 can configure the grouping of pixels 404 within a given row by writing, via control signal 411, control bits with either a "0" or "1" to each of the control bit buffers 609 as appropriate.

When two adjacent column control lines 604 are paired (i.e., electrically connected), a single column driver may be used to drive both column control lines 604 (and thus each column driver may include additional circuitry to compensate for the additional drive strength needed to drive both control lines). As such, rather than having to write a separate pixel value to each column buffer 602, for paired pixels, a single pixel value may be written to one of the column buffers 602 for the pair, and the corresponding column driver will drive both column control lines 604 based on that single pixel value, and thus control the two paired pixels of the row to emit light of the same color and intensity.

To illustrate, assuming a foveal region 610 and peripheral region 612 as shown in FIG. 6, when configuring the display panel 401 to display row 2, the foveal control component 420 may write a "1" to the control bit buffer 609 linking the column control lines 604 for columns 0 and 1, and thus pairing pixels (2,0) and (2,1), write a "1" to the control bit buffer 609 linking the column control lines 604 for columns 2 and 3, and thus pairing pixels (2,2) and (2,3), write a "0" to the control bit buffers 609 associated with the column control lines 604 for columns 4-9, and thus maintaining pixels (2,4), (2,5), (2,6), (2,7), (2,8), and (2,9) as unpaired pixels as they are within the foveal region 610, and write a "1" to the control bit buffers 609 linking the column control lines 604 for columns 10 and 11 and columns 12 and 13, and thus pairing pixels (2,10) and (2,11) and pairing pixels (2,12) and (2,13), respectively. Further, in this example, assume that the pixel data 614 for row 2 in this configuration is composed of ten pixel values, as shown in Table 1 below:

TABLE 1 example pixel value assignment

| Pixel Value | Corresponding Pixel(s) |
|---|---|
| 9 | (2, 0), (2, 1) |
| 0 | (2, 2), (2, 3) |
| 1 | (2, 4) |
| 5 | (2, 5) |
| 7 | (2, 6) |
| 3 | (2, 7) |
| 8 | (2, 8) |
| 2 | (2, 9) |
| 0 | (2, 10), (2, 11) |
| 1 | (2, 12), (2, 13) |

It will be appreciated that while only ten pixel values are needed to drive the fourteen pixels of row 2 in this configuration, the row buffer 410 has fourteen column buffers 602 for the fourteen pixels 404 in this example. Accordingly, to facilitate proper alignment of pixel value and the corresponding pixel, the foveal control component 420 may provide control signaling 616 to scan-in logic 619 used to scan the pixel data 614 into the column buffers 602, where the control signaling 616 identifies which pixels have been paired. Based on this information, the scan-in logic 619 writes a corresponding pixel value to one of the two column buffers 602 of a paired pixel set and skips the other column buffer 602 or writes a zero value or other null value to the other column buffer 602 of the paired pixel set.

Further, in embodiments wherein pixels in adjacent rows may be paired or grouped, the row combination logic 418 may be implemented in a manner similar to that of the column combination logic 414 of FIG. 6. Thus, the row combination logic 418 may include a switch array 618 comprising a plurality of transistors or other switch components 620 and control bit buffers 622. Each switch component 620 is connected to two adjacent row control lines 624 and operates to either electrically connect or electrically isolate the two row control lines 624 based on the bit value current stored in the corresponding control bit buffers 622 via control signal 613 provided by the foveal control component 420. Thus, the foveal control component 420 may tie together two rows of pixels that are entirely composed of peripheral pixels such that when the corresponding column control line 604 is driven by a column driver based on a corresponding pixel value, the two paired pixels in that column are controlled to emit light of the same color and intensity based on that pixel value. Thus, with two row-adjacent pixels tied to the same pixel value and with each of these pixels capable of being tied to a corresponding column-adjacent pixel, through the corresponding configuration of the switch arrays 606, 618, one pixel value may be used to drive a 2×2 array of pixels 404, and thus reducing the pixel data transmission and clock-in power consumption by 75% for this 2×2 array of pixels 404 compared to a conventional display panel that requires a separate pixel value to be scanned in for each pixel.

FIG. 7 illustrates another example implementation of the display panel 401 in accordance with some embodiments. As with the example of FIG. 6 described above, the row buffer 410 may be implemented as a set of column buffers 602, with each column buffer 602 being associated with a corresponding column of pixels 404 and configured to store a pixel value that controls a column driver (not shown in FIG. 7) to drive a corresponding current on the column control line 604 associated with the corresponding column. However, rather than have the switching array that connects pairs of column control lines 604 together, in the implementation of FIG. 7 a single pixel value in received pixel data for a row is duplicated for the buffers of paired peripheral pixels 404 as the pixel data is scanned in via the scan-in logic 719 that serves as the input for the display panel 401.

In at least one embodiment, the scanning in of pixel data from the display controller 428 to the row buffer 410 is controlled using two clocks: a data clock 704 used to control the timing of the data signal on the interconnect between the display controller 428 and scan-in logic 719 of the display panel 401, and a pixel clock 706 used by the scan-in logic 719 to sample the data signal to obtain a pixel value that is shifted into a corresponding buffer 602. Thus, in at least one embodiment, the foveal control component 420 may manipulate the scan-in process so that the same pixel value from incoming pixel data is duplicated for the two column buffers 602 of a paired pixel set by slowing the data clock 704 via control signaling 708 when scanning in such pixel value such that the data signal representing the pixel value is sampled twice by the scan-in logic 619 on the basis of the pixel clock 706, and thus is output twice by the scan-in logic 719 for storage in two adjacent buffers 602. Timing diagram 720 of FIG. 7 illustrates this process using the same example presented in FIG. 6 with respect to receipt of a data signal representing pixel data 614 comprising 10 pixel values for driving the pixels of row 2, which includes both pixels that fall within the foveal region 610 and pixels that fall within the peripheral region 612. Alternatively, the frequency of the pixel clock 706 may be doubled while maintaining the data clock 704 at a constant frequency to obtain this double sampling of the pixel values.

Rather than using a single serial path for loading the pixel data, some display panels utilize multiple parallel lanes for transmitting pixel data so as to reduce the frequency of the pixel clock. FIG. 8 illustrates an example implementation in which multiple lanes (four in this example) are utilized to load pixel data, and wherein grouping of peripheral pixels is attained by tying together subsets of the lanes. In this example implementation, the row buffer 410 is implemented as a set of column buffers 802 (with sixteen column buffers 802 for the sixteen pixel columns depicted), and with four lane buffers 811-814, denoted Lane 1-Lane 4, respectively. Pixel data for a row of pixels is loaded in parallel into the four lane buffers 811-814. Lane buffer 811 shifts its loaded pixel values into the column buffers 802 for columns 0, 4, 8, and 12, lane buffer 812 shifts its loaded pixel values into the column buffers 802 for columns 1,5,9, and 13, lane buffer 813 shifts its loaded pixel values into the column buffers 803 for columns 2,6,10, and 14, and lane buffer 814, shifts its loaded pixel values into the column buffers 803 for columns 3,7,11, and 15.

To facilitate duplicate loading of pixel values for peripheral pixels, the column combination logic 414 is implemented as a set of switches that pair two respective lanes, with switch 816 operable to electrically connect lanes 1 and 2 when activated, switch 817 operable to electrically connect lanes 2 and 3 when activated, and switch 818 operable to electrically connect lanes 3 and 4 when activated, and with the foveal control component 420 controlling the switches 816-818 via control signals 821-823, respectively.

With this approach, the foveal control component 420 can selectively activate one or more of the switches 816-818 to tie two or more lanes together, such that lanes 1 and 2 can be paired, lanes 3 and 4 can be paired, or all four lanes may be tied together. For two or more lanes connected together via the switches 816-818, pixel data need be supplied to only one of the lanes and the connection provided by the corresponding switch will result in the pixel data being replicated in the other connected lane(s). Thus, using this four lane approach, the display panel 401 may be operated at full resolution, half resolution, or one-quarter resolution. Thus, through control of the lane connections via the switches 816-818, the scan-in of a row of pixel data need only operate at high resolution for that portion of the row, if any, that contains pixel data for a portion of a foveal region of the display image.

For example, assume a partitioning of the pixels 404 of the display panel 401 into the illustrated foveal region 810 and proximate peripheral region 813. When a display image is foveally rendered based on this partitioning, control information is generated for the foveal control component 420 and which indicates that pixels of row 2 at columns 0 and 1 are to be grouped together as paired peripheral pixels, the pixels of row 2 at columns 2 and 3 are to be grouped together as paired peripheral pixels, the pixels of row 2 at columns 4, 5, 6, 7, 8, 9, 10, and 11 are to remain ungrouped as foveal pixels, the pixels of row 2 at columns 12 and 13 are to be grouped together as paired peripheral pixels, and the pixels of row 2 at columns 14 and 15 are to be grouped together as paired peripheral pixels. Accordingly, the load of pixel data for row 2 begins with the foveal control component 420 activating switch 816, which has the effect of tying together the column buffers 802 for columns 0 and 1. Thus, when the first pixel value for row 2 is loaded into lane 1 from pixel data 815 being transmitted for row 2, this pixel value is replicated and stored in the column buffers 802 for both columns 0 and column 1. The foveal control component 420 then deactivates switch 816 and activates switch 818, which ties together the column buffers 802 for columns 2 and 3. Thus, when the second pixel value is loaded into lane 3, it is replicated and thus the same pixel value is stored in the column buffers 802 for columns 2 and 3. The foveal control component 420 then deactivates all of the switches 816-818 and the third pixel value, fourth pixel value, fifth pixel value, and sixth pixel value are loaded into lanes 1-4 respectively, and then are transferred to the column buffers 802 for columns 4-7, respectively. The seventh, eighth, ninth, and tenth pixel values are then loaded into lanes 1-4 respectively, and then transferred to the column buffers 802 for columns 8-11, respectively. Thereafter, the foveal control component 420 again activates switch 816 so that the eleventh received pixel value in lane 1 is replicated for lane 2, and thus filling the column buffers 802 of columns 12 and 13 with the eleventh pixel value. The foveal control component 420 then activates the switch 818 such that the twelfth received pixel value in lane 3 is replicated in lane 4 and thus the column buffers 802 for columns 14 and 15 are both filled with the twelfth pixel value. The row select logic 414 then activates the control line for row 2, and the column drivers drive the pixels of row 2 based on the pixel values stored in their corresponding column buffer 802.

The foveal display techniques of the present disclosure are described above with reference to examples with relatively low resolution for ease of illustration. However, when considered in the context of the much larger resolutions of actual display panels that may utilize these techniques, the advantageous reduction in pixel data bandwidth and display backplane switching power consumption becomes even more apparent. To illustrate, consider a display panel providing a field of view of 110 degrees both horizontally and vertically. Assuming foveal resolution of approximately 1 minute of arc, such a display would require approximately 6,600 pixels horizontally and 6,600 pixels vertically, or 43.56 million pixels total. If each pixel requires three bytes (one byte each for red, green, and blue subpixels), a display image requires approximately 131 megabytes (MB). At a frame rate of 120 hertz (Hz), a conventional display panel would require a bandwidth of approximately 15.7 gigabytes per second (GB/s), with a corresponding rate of switching power consumption.

However, using the techniques described herein, if a foveal region of five degrees horizontal by five degrees vertical is implemented, the foveal region would require 90,000 pixels, and at three bytes per pixel, the foveal region of each display image is approximately 270 kilobytes (KB). Thus, at 120 Hz frame rate, the data bandwidth required to transfer the foveal region of each display image is approximately 32.4 MB/s. If a proximate peripheral region, or border region, of 30 degrees×30 degrees at two minutes per pixel also is implemented, and this proximate peripheral region is implemented at half resolution (that is, the pixels are paired in subsets of two), the required data rate for transmitting the proximate peripheral regions of the display images is approximately 203 MB/s. If the remaining region of the display image is implemented as a distal peripheral region with one-quarter resolution (that is, the pixels are grouped in subsets of four), the required data rate for transmitting the distal peripheral regions of the display images is approximately 518 MB/s. Thus, the total data rate to transfer foveally rendered display images in accordance with the techniques described above in this example is approximately 753 MB/s, compared to the 15.7 GB/s data rate noted above for a conventional display panel. Thus, this example illustrates a reduction by a factor of 20 in the required pixel data transfer bandwidth compared to conventional approaches, with little or no detrimental impact in perceived image quality due to the foveal perception characteristics of the human eye.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. An "application", or "software" may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A display system comprising:
   a display panel comprising:
      an input to receive pixel data of a display image, the pixel data specifying pixel colors of the display image and comprising a plurality of foveal pixel values including a corresponding separate pixel value for each pixel within a foveal region of the display image and a plurality of peripheral pixel values for pixels of at least one peripheral region of the display image;
      an array of pixels partitioned into the foveal region and at least one peripheral region; and
      an array controller to group pixels of the array in the at least one peripheral region into subsets of at least two pixels and to control each subset by duplicating one instance of pixel data from the plurality of peripheral pixel values, wherein the array controller is further to control each pixel of the array in the foveal region using the corresponding separate pixel value from the plurality of foveal pixel values.

2. The display system of claim 1, wherein:
   the array controller comprises column combination logic to group at least two adjacent pixels of a row of the array into a corresponding subset.

3. The display system of claim 2, wherein the array controller further comprises:
   a set of column buffers, each column buffer associated with a corresponding column of the array and to store a pixel value that is used by a column driver to drive a column control line of the corresponding column;
   a switch array comprising a plurality of switches and control bit buffers, each switch operable to selectively electrically connect the column control lines of a corresponding subset of two or more columns of the array based on a control bit stored to a corresponding control bit buffer; and
   a foveal control component to store control bits to the control bit buffers based on a position of the foveal region and a position of each of the at least one peripheral regions.

4. The display system of claim 2, wherein the array controller further comprises:
   a set of column buffers, each column buffer associated with a corresponding column of the array and to store a pixel value that is used by a column driver to drive a column control line of the corresponding column;
   scan-in logic to sample a data signal representing the pixel data to generate the pixel values, wherein each sampled pixel value is provided for storage in a corresponding column buffer; and
   a foveal control component to control a sample rate of the scan-in logic such that, for each of the subsets of at least two pixels a corresponding portion of the data signal representing a single pixel value is sampled multiple times so as to replicate the pixel value for each column buffer of the column buffers associated with the subset.

5. The display system of claim 2, wherein the array controller further comprises:
   a set of column buffers, each column buffer associated with a corresponding column of the array and to store a pixel value that is used by a column driver to drive a column control line of the corresponding column;
   a plurality of lanes to receive the pixel data in parallel, each lane having a lane buffer coupled to a corresponding subset of column buffers of the set of column buffers;
   a switch array comprising a plurality of switches, each switch operable to selectively electrically connect a corresponding subset of two or more lanes of the plurality of lanes when activated; and
   a foveal control component to selectively activate switches of the switch array based on a position of the foveal region and a position of each of the at least one peripheral regions.

6. The display system of claim 2, wherein:
   the array controller further comprises row combination logic to group at least two adjacent pixels in a column of the array into a corresponding subset.

7. The display system of claim 1, wherein:
   the array of pixels is partitioned into multiple peripheral regions; and
   a number of pixels grouped into a subset for one of the multiple peripheral regions is based on a distance of the peripheral region from the foveal region.

8. The display system of claim 1, wherein:
   the array of pixels is partitioned into a first peripheral region proximate to the foveal region and a second peripheral region distal from the foveal region; and
   the array controller is to group the pixels of the array in the first peripheral region into corresponding subsets of N pixels and to group the pixels of the array in the second peripheral region into corresponding subsets of M pixels, M being greater than N.

9. The display system of claim 1, wherein:
the array of pixels is partitioned into a first peripheral region proximate to the foveal region and a second peripheral region distal from the foveal region; and
the array controller is to group the pixels of the array in the first peripheral region into corresponding subsets of N pixels and to group the pixels of the array in the second peripheral region into corresponding subsets of M pixels, M being greater than N.

10. The display system of claim 1, further comprising:
a rendering system to foveally render a display image based on the locations of the foveal region and the at least one peripheral regions for the array, wherein for each row of the display image having pixels within at least one of the peripheral region, a number of pixel values represented in the pixel data for the row is less than a number of pixels in the row; and
a display controller connected to the input of the display panel via an interconnect, the display controller to transmit the pixel data of the display image on a row-by-row basis.

11. A method comprising:
partitioning an array of pixels of a display panel into a foveal region and at least one peripheral region;
grouping pixels in the at least one peripheral region into subsets of at least two pixels;
receiving pixel data of a display image, the pixel data specifying pixel colors of the display image and comprising a plurality of foveal pixel values including a corresponding separate pixel value for each pixel within a foveal region of the display image and a plurality of peripheral pixel values for pixels of at least one peripheral region of the display image;
controlling each subset of at least two pixels of the array in the peripheral region by duplicating one instance of pixel data of the plurality of peripheral pixel values; and
controlling each pixel of the array in the foveal region using the corresponding separate pixel value from the plurality of foveal pixel values.

12. The method of claim 11, wherein:
grouping pixels in the at least one peripheral region into subsets of at least two pixels comprises grouping at least two adjacent pixels of a row of the array into a corresponding subset.

13. The method of claim 12, further comprising:
storing the plurality of foveal pixel values and the plurality of peripheral pixel values to a set of column buffers, each column buffer associated with a corresponding column of the array and storing a pixel value that is used by a column driver to drive a column control line of the corresponding column; and
configuring a switch array based on the partitioning of the array, the switch array comprising a plurality of switches and control bit buffers, each switch operable to selectively electrically connect the column control lines of a corresponding subset of two or more columns of the array based on a control bit stored to a corresponding control bit buffer.

14. The method of claim 12, further comprising
storing the plurality of foveal pixel values and the plurality of peripheral pixel values to a set of column buffers, each column buffer associated with a corresponding column of the array and storing a pixel value that is used by a column driver to drive a column control line of the corresponding column;

sampling a data signal representing the pixel data to generate the pixel values, wherein each sampled pixel value is provided for storage in a corresponding column buffer; and
controlling a sample rate of the sampling such that, for each of the subsets of at least two pixels a corresponding portion of the data signal representing a single pixel value is sampled multiple times so as to replicate the pixel value for each column buffer of the column buffers associated with the subset.

15. The method of claim 12, further comprising:
storing the pixel data in parallel to a plurality of lanes to receive the pixel data in parallel, each lane having a lane buffer coupled to a corresponding subset of column buffers of a set of column buffers, each column buffer associated with a corresponding column of the array and storing a pixel value that is used by a column driver to drive a column control line of the corresponding column; and
selectively activating switches of a switch array based on the partitioning, the switch array comprising a plurality of switches, each switch operable to selectively electrically connect a corresponding subset of two or more lanes of the plurality of lanes when activated.

16. The method of claim 12, wherein:
grouping pixels in the at least one peripheral region into subsets of at least two pixels comprises grouping at least two adjacent pixels in a column of the array into a corresponding subset.

17. The method of claim 11, wherein:
partitioning the array of pixels comprises partitioning the array of pixels into multiple peripheral regions; and
a number of pixels grouped into a subset for one of the multiple peripheral regions is based on a distance of the peripheral region from the foveal region.

18. The method of claim 11, wherein:
partitioning the array of pixels comprises partitioning the array of pixels into a first peripheral region proximate to the foveal region and a second peripheral region distal from the foveal region; and
grouping the pixels comprises grouping the pixels of the array in the first peripheral region into corresponding subsets of N pixels and grouping the pixels of the array in the second peripheral region into corresponding subsets of M pixels, M being greater than N.

19. The method of claim 11, wherein:
partitioning the array of pixels comprises partitioning the array of pixels into a first peripheral region proximate to the foveal region and a second peripheral region distal from the foveal region; and
grouping the pixels comprises grouping the pixels of the array in the first peripheral region into corresponding subsets of N pixels and grouping the pixels of the array in the second peripheral region into corresponding subsets of M pixels, M being greater than N.

20. The method of claim 11, further comprising:
foveally rendering a display image based on the locations of the foveal region and the at least one peripheral regions for the array, wherein for each row of the display image having pixels within at least one of the peripheral region, a number of pixel values represented in the pixel data for the row is less than a number of pixels in the row; and
transmitting the pixel data of the display image from a display controller to the display panel via an interconnect on a row-by-row basis.

* * * * *